US 6,559,249 B2

(12) United States Patent
Yang et al.

(10) Patent No.: US 6,559,249 B2
(45) Date of Patent: May 6, 2003

(54) CATALYST FOR PRODUCING AN ULTRAHIGH MOLECULAR WEIGHT POLYETHYLENE (UHWMP) AND METHOD FOR PRODUCING AN UHWMP USING THE SAME

(75) Inventors: Chun-Byoung Yang, Taejon-shi (KR); Ho-Sik Chang, Taejon-shi (KR); Weon Lee, Taejon-shi (KR)

(73) Assignee: Samsung General Chemicals Co. Ltd., Seosan-shi (KR)

( * ) Notice: Subject to any disclaimer, the term of this patent is extended or adjusted under 35 U.S.C. 154(b) by 0 days.

(21) Appl. No.: 09/801,198

(22) Filed: Mar. 6, 2001

(65) Prior Publication Data

US 2002/0045537 A1 Apr. 18, 2002

(51) Int. Cl.[7] ............................... C08F 4/58; C08F 4/42

(52) U.S. Cl. .................... 526/124.3; 526/348; 526/158; 526/142; 526/128; 526/134; 526/123.1; 526/125.3; 502/103; 502/111; 502/126; 502/127; 502/132; 502/133

(58) Field of Search .............................. 526/348, 124.3, 526/158, 142, 128, 134, 123.1, 125.3; 502/103, 111, 126, 127, 132, 133

(56) References Cited

U.S. PATENT DOCUMENTS

| | | |
|---|---|---|
| 3,878,124 A | 4/1975 | Durand et al. |
| 4,069,169 A | 1/1978 | Toyoda et al. |
| 4,071,672 A | 1/1978 | Kashiwa |
| 4,071,674 A | 1/1978 | Kashiwa et al. |
| 4,076,924 A | 2/1978 | Toyota et al. |
| 4,085,276 A * | 4/1978 | Toyota et al. ................ 526/122 |
| 4,107,413 A | 8/1978 | Giannini et al. |
| 4,107,414 A | 8/1978 | Giannini et al. |
| 4,156,063 A | 5/1979 | Giannini et al. |
| 4,157,435 A | 6/1979 | Toyota et al. |
| 4,187,196 A | 2/1980 | Giannini et al. |
| 4,220,554 A | 9/1980 | Scatá et al. |
| 4,226,963 A | 10/1980 | Giannini et al. |
| 4,315,835 A | 2/1982 | Scatá et al. |
| 4,315,874 A | 2/1982 | Ushida et al. |
| 4,330,649 A | 5/1982 | Kioka et al. |
| 4,336,360 A | 6/1982 | Giannini et al. |
| 4,355,143 A | 10/1982 | Lassalle et al. |
| 4,399,054 A | 8/1983 | Ferraris et al. |
| 4,401,589 A | 8/1983 | Kioka et al. |
| 4,439,540 A | 3/1984 | Cecchin et al. |
| 4,477,639 A | 10/1984 | Nielsen |
| 4,518,706 A | 5/1985 | Gessell |
| 4,613,655 A | 9/1986 | Longi et al. |
| 4,806,433 A | 2/1989 | Sasaki et al. |
| 4,816,433 A | 3/1989 | Terano et al. |
| 4,829,037 A | 5/1989 | Terano et al. |
| 4,843,049 A | 6/1989 | Invernizzi et al. |
| 4,847,227 A | 7/1989 | Murai et al. |
| 4,847,639 A | 7/1989 | Sugata et al. |
| 4,866,022 A | 9/1989 | Arzoumanidis et al. |
| 4,912,074 A | 3/1990 | Miro |
| 4,946,816 A | 8/1990 | Cohen et al. |
| 4,952,649 A | 8/1990 | Kioka et al. |
| 4,962,167 A | 10/1990 | Shiraishi et al. |
| 4,970,186 A | 11/1990 | Terano et al. |
| 4,978,648 A | 12/1990 | Barbé et al. |
| 4,988,656 A | 1/1991 | Arzoumanidis et al. |
| 4,990,479 A | 2/1991 | Ishimaru et al. |
| 5,013,702 A | 5/1991 | Arzoumanidis et al. |
| 5,059,570 A | 10/1991 | Bailly et al. |
| 5,061,667 A | 10/1991 | Murata et al. |
| 5,081,090 A | 1/1992 | Arzoumanidis et al. |
| 5,106,807 A | 4/1992 | Morini et al. |
| 5,124,297 A | 6/1992 | Arzoumanidis et al. |
| 5,130,284 A | 7/1992 | Terano et al. |
| 5,134,104 A | 7/1992 | Sasaki et al. |
| 5,175,332 A | 12/1992 | Chatterton et al. |
| 5,182,245 A | 1/1993 | Arzoumanidis et al. |

(List continued on next page.)

FOREIGN PATENT DOCUMENTS

| | | |
|---|---|---|
| DE | 2 153 520 | 5/1972 |
| DE | 2 230 672 | 12/1972 |
| DE | 2 230 728 | 12/1972 |
| DE | 2 230 752 | 12/1972 |
| DE | 26 05 922 | 8/1976 |
| DE | 25 53 104 | 6/1977 |
| DE | 25 04 036 | 8/1978 |
| EP | 0 350 170 | 3/1994 |
| EP | 0 606 125 | 5/1997 |
| EP | 0 602 922 | 1/1998 |

OTHER PUBLICATIONS

Abstracts of BE895019 published Mar./1983, DE3241999 published May/183, GB2111066 published Jun./1983, and US4952649 published Aug./1990, printed from Dialog Web.

(List continued on next page.)

Primary Examiner—David W. Wu
Assistant Examiner—Ling-Siu Choi
(74) Attorney, Agent, or Firm—Meyertons, Hood, Kivlin, Kowert & Goetzel, P.C.; Eric B. Meyertons

(57) ABSTRACT

The present invention provides a catalyst for producing an ultra high molecular weight polyethylene and also a method for preparation of an ultra high molecular weight polyethylene with the use of said catalyst. The catalyst of the present invention is prepared by a process comprising: (i) producing a magnesium compound solution by contact-reacting a magnesium compound and an aluminum or boron compound with alcohol; (ii) contact-reacting the said solution with an ester compound containing at least one hydroxy group and a silicon compound containing an alkoxy group; and (iii) producing of a solid titanium catalyst by adding a mixture of a titanium compound and a silicon compound thereto. The catalyst prepared by the present invention has excellent catalytic activity, and it helps to produce an ultra-high molecular weight polyethylene with large bulk density and narrow particle distribution without too large and minute particles.

26 Claims, No Drawings

U.S. PATENT DOCUMENTS

| | | |
|---|---|---|
| 5,419,116 A | 5/1995 | Rast et al. |
| 5,459,116 A | 10/1995 | Ro et al. |
| 5,502,128 A | 3/1996 | Flores et al. |
| 5,585,317 A | 12/1996 | Sacchetti et al. |
| 5,587,440 A | 12/1996 | Ehlers et al. |
| 5,726,261 A | 3/1998 | Sacchetti et al. |
| 5,780,378 A | 7/1998 | Toida et al. |
| 5,844,046 A | 12/1998 | Ohgizawa et al. |
| 5,849,654 A | 12/1998 | Fushimi et al. |
| 5,968,862 A | 10/1999 | Abbott et al. |
| 6,291,385 B1 * | 9/2001 | Lee et al. .................. 502/111 |

OTHER PUBLICATIONS

Abstract of JP7316987 published Dec./1995.
Abstract of JP52087486 published Jul./1977.
Abstract of JP54040239 published Mar./1979.
Abstract of JP58083006 published May/1983.
Abstract of JP63054004 published Mar./1988.
Abstract of JP63191811 published Aug./1988.
Abstract of JP63040711 published Feb./1988.
Abstract of JP51136625 published Nov./1976.
Abstract of KR9202488 published Jan./1990.
Abstract of KR9300665 published Sep./1990.
Abstract of JP7316986 published Dec./1995.
Abstract of CA1040379 published Oct./1978.

Tinkler et al., "Polymerisation of ethene by the novel titanium complex [Ti(Me$_3$SiNCH$_2$CH$_2$NsiMe$_3$)Cl$_2$]; a metallocene analogue," Chem. Commun., 1996, pp. 2623–2624.

Edelmann, "N–silylated benzamidines: versatile building blocks in main group and coordination chemistry," Coordination Chemistry Reviews, vol. 137, 1994, pp. 403–481.

Zhou et al., "Synthesis and Structure of Novel Bridged Dinuclear Indium Complexes," Inorg. Chem., 1996, vol. 35, pp. 1423–1424.

Zhou et al., "Bulky Amidinate Complexes of Tin(IV). Synthesis and Structure of Sn(RNC(R')NR)$_2$C2$_2$ (R=Cyclohexyl, R'= H, Me; R= SiMe$_3$, R'=$^t$Bu)," Inorg. Chem., 1997, vol. 36, pp. 501–504.

Linden et al., "Polymerization of β–Olefins and Butadiene and Catalytic Cyclotrimerization of 1–Alkynes by a New Class of Group IV Catalysts. Control of Molecular Weight and Polymer Microstructure via Ligand Tuning in Sterically Hindered Chelating Penoxide Titanium and Zirconium Species," J. Am. Chem. Soc., 1995, vol. 117, pp. 3008–3021.

Stokes et al., "Reactions of Cobaloxime Anions and/or Hydrides with Enynes as a New, General Route to 1,3– and 1,2–Dienylcobaloxime Complexes," Organometallics, 1996, vol. 15, pp. 2624–2632.

* cited by examiner

CATALYST FOR PRODUCING AN ULTRAHIGH MOLECULAR WEIGHT POLYETHYLENE (UHWMP) AND METHOD FOR PRODUCING AN UHWMP USING THE SAME

BACKGROUND OF THE INVENTION AND PRIOR ART

The present invention relates to a catalyst for preparing an ultra high molecular weight polyethylene (UHMWPE) and also a method for preparing a UHMWPE with the use of that catalyst, and particularly relates to a solid complex titanium catalyst supported by a carrier containing magnesium for production of UHMWPE along with a preparation method by the use of that catalyst, of a UHMWPE with a large bulk density and narrow particle distribution with few untowardly large or small particles.

UHMWPE, a sort of polyethylene resin, having a molecular weight of at least 10 g/mol or more, and, according to ASTM 4020, is defined as "linear polyethylene having a relative viscosity of 2.30 or more when measured in 100 ml of 0.05% decahydronaphthalene solution at 135° C." Because UHMWPE has a larger molecular weight than the polyethylene for ordinary use, it has excellent characteristics in strength, wear resistance, self-lubricating ability, chemical resistance, and electrical properties. Owing to these excellent properties, UHMWPE can be considered a special raw material having high quality obtained from a common raw material.

UHMWPE prepared by the process of polymerization is so large in molecular weight it can not be prepared in pellets, as is the case for ordinary polyethylene, but in powder for commercial use. In powder form, the size and distribution of the polymer powders should be considered important. Thus the particle size distribution of the polymer, and the existence or absence of minute particles are the decisive factors for the quality of the catalyst used.

A magnesium-containing catalyst, based on titanium, for the preparation of UHMWPE and its manufacturing process have been reported. A method making use of a magnesium solution intended to obtain a catalyst for polymerization of olefin having high bulk density has also been learned. U.S. Pat. No. 4,962,167 has disclosed the process of preparing a catalyst obtained by reacting what has been produced by reaction of a magnesium halide compound and a titanium alkoxide compound on one hand with what has been obtained by reaction of an aluminum halide and a silicon alkoxide compound on the other. The catalyst thus prepared provides a polymer of relatively high bulk density, but has to be improved, not to say the problems in the catalytic activity.

U.S. Pat. No. 5,587,440 disclosed a preparation method for a polymer with a narrow particle size distribution and a high bulk density by reducing a titanium(IV) halide to an organic aluminum compound and subjecting it to a post-treatment process, but this product has a demerit of relatively low catalytic activity.

As has been examined above, a preparation method for a catalyst with high polymerization activity to produce an UHMWPE having a high bulk density as well as narrow particle size distribution so that the polymer may have a reduced amount of untowardly big or minute particles, through a simple process though, is demanded to be developed.

To meet such a need, the present invention hereby intends to provide a method for preparation of a catalyst, which is excellent in its catalytic activity and can help produce a UHMWP having a high bulk density and, a narrow particle size distribution with few untowardly large or small particles; the method can be performed through a simple process by using raw materials of low cost. In addition, the detailed steps or processes for production of the catalyst, provided by the present invention, have never been known in any prior art.

OBJECT OF INVENTION

An objective of the present invention is to provide a highly active catalyst for the production of UHMWPE, leading to production of a polymer of high bulk density and such a narrow particle distribution as to evade too large or too small particles.

Another objective is to provide a UHMWPE by a simple yet practical production method and process. Still other objectives and advantages of the present invention will be seen more clearly by referring to the following descriptions and the claims of the present invention.

DETAILED DESCRIPTION OF INVENTION

The catalyst of the present invention for UHMWPE production is characterized by comprising the following, simple yet effective steps: (i) forming a magnesium compound solution by contact-reacting a mixture of a halogenated magnesium compound and an aluminum or a boron compound with alcohol; (ii) reacting the formed magnesium compound solution with an ester compound having at least one hydroxy group and a silicon compound having an alkoxy group; and (iii) producing a solid titanium catalyst by adding a mixture of a titanium compound and a silicon compound thereto.

The kind of halogenated magnesium compounds which can be used in production of the catalyst in the present invention includes: dihalogenated magnesiums such as magnesium chloride, magnesium iodide, magnesium fluoride, or magnesium bromide; alkylmagnesium halides such as methylmagnesium halide, ethylmagnesium halide, propylmagnesium halide, butylmagnesium halide, isobutylmagnesium halide, hexylmagnesium halide, or amylmagnesium halide; alkoxymagnesium halides such as methoxymagnesium halide, ethoxymagnesium halide, isopropoxymagnesium halide, butoxymagnesium halide, or octoxymagnesium halide; and aryloxymagnesium halides such as phenoxymagnesium halide or methylphenoxymagnesium halide. Of the above-named compounds, a mixture of two or more can also be used, and these magnesium compounds can also be effective when they are used in the form of a complex with other metals.

The above-listed magnesium compounds can be represented by simple chemical formulae, but some magnesium compounds can not be represented by simple formula, depending on their manufacturing process. In such cases they generally can be regarded as mixtures of these listed magnesium compounds. For instance, the following compounds can also be used in the present invention: as the compounds obtained by reacting a magnesium compound with a polysiloxane compound, a halogen-containing silane compound, ester, or alcohol; the compounds obtained by reacting a magnesium metal with alcohol, phenol, or ether in the presence of halosilane, phosphor pentachloride, or thionyl chloride. The preferable magnesium compounds are magnesium halides, specifically, magnesium chloride, alkylmagnesium chloride, preferably including alkyl group having the number of 1~10 carbon atoms, alkoxymagnesium chlorides, preferably including alkoxy group having the number of 1~10 carbons; aryloxy magnesium chlorides, preferably including aryloxy group having the number of 6~20 carbons. The magnesium solution used in the present invention can be produced by using the aforesaid magnesium compounds in an alcohol in the presence or absence of a hydrocarbon solvent. The kinds of hydrocarbon solvent which can be used here include, for instance: aliphatic hydrocarbons such as pentane, hexane, heptane, octane, decan or kerosene; alicyclic hydrocarbons such as cyclobenzene, methylcyclobenzene, cyclohexane, or methylcyclohexane; aromatic hydrocarbons such as benzene, toluene, xylene, ethylbenzene, cumene, or cymene; and such halogenated hydrocarbons such as dichloropropane, dichloroethylene, trichloroethylene, carbon tetrachloride, or chlorobenzene.

As for the aluminum compound to be used together with the magnesium compound in the present invention is preferably one or more compounds chosen from the group consisting of: aluminum halides including aluminum fluoride, aluminum bromide, aluminum chloride or aluminum iodide; compounds having a general formula of $AlR^1_n(OR^2)_{3-n}$, (wherein, $R^1$ is hydrocarbon having 1~20 carbons or a halogen element, $R^2$ represents hydrocarbon having 1~20 carbons, and "n" means a natural number from 0 to 3) and; mixtures thereof. The compound represented by the general formula $AlR^1_n(OR^2)_{3-n}$ includes, for example aluminum triethoxide, aluminum triisopropoxide, aluminum tributoxide, or aluminum tri-2-ethylhexanoate, etc. can be used.

As for the boron compound to be used together with the magnesium compound in the production of the catalyst in the present invention, one or more compounds selected from a group consisting of boron halides including boron fluoride, boron chloride, or boron bromide; compounds represented by $BR^1_n(OR^2)_{3-n}$ (wherein $R^1$ is a hydrocarbon having 1~20 carbons or a halogen element, $R^2$ is hydrocarbon having 1~20 carbons, and "n" is a natural number from 0 to 3), and mixtures of these, are preferable. Particularly, the compounds represented by the general formula $BR^1_n(OR^2)_{3-n}$ includes for example, trimethylborate, triethylborate, tributylborate, triphenylborate, methylborondiethoxide, ethylborondiethoxide, ethylborondibutoxide, butylborondibutoxide, boron triethoxide, boron tributoxide, phenylboron diphenoxide, diethylboronethoxide, dibutylboronethoxide, diphenylboronphenoxide, diethoxyboronchloride, diethoxyboronbromide, diphenoxyboronchloride, ethoxyborondichloride, ethoxyborondibromide, butoxyborondichloride, phenoxyborondichloride, ethylethoxyboronchloride, etc. In order to obtain the catalyst effective in producing an UHMWPE of the present invention, having a high bulk density and a narrow particle distribution, the preferred molar ratio of the magnesium compound to the aluminum or boron compound is less than 1:0.25, more preferably 1:0.15.

For the conversion of the magnesium compound into a magnesium solution in the present invention, alcohol is used in the presence of hydrocarbon. The kinds of alcohol used in the process include alcohols having 1~20 carbons for example, methanol, ethanol, propanol, butanol, pentanol, hexanol, octanol, decanol, dodecanol, octadecylalcohol, benzylalcohol, phenylethylalcohol, isopropylbenzylalcohol, and cumylalcohol, and particularly alcohols having 1~12 carbons are preferred. Although the desired average size and the particle distribution of the catalyst can vary depending on the kind and the total amount of the alcohol used, and the kind of magnesium compound, the ratio of magnesium to alcohol, etc., but the total amount of the alcohol to obtain the magnesium solution is preferably, at least 0.5 mol, more preferably about 1.0~20 mols, still preferably about 2.0~10 mols per 1 mol of the magnesium compound. The reaction of the magnesium and the alcohol for the production of the magnesium compound solution is preferably performed in a hydrocarbon medium, the temperature preferably, though depending on the kinds and amount of the alcohol, being at about −25° C., preferably −10~200° C., and more preferably about 0~150° C., for about 15 minutes ~5 hours, preferably about 30 minutes ~4 hours.

As for the ester compound to be used in the present invention as an electron donor, may includes the followings, for example: unsaturated fatty acid esters containing at least one hydroxy group such as 2-hydroxy ethylacrylate, 2-hydroxy ethylmethacrylate, 2-hydroxy propylacrylate, 2-hydroxy propylmethacrylate, 4-hydroxy butylacrylate, or pentaerythritol triacrylate; aliphatic monoesters or polyesters containing at least one hydroxy group such as 2-hydroxy ethylacetate, methyl 3-hydroxy butyrate, ethyl 3-hydroxy butyrate, methyl 2-hydroxy isobutyrate, ethyl 2-hydoxy isobutyrate, methyl-3-hydroxy-2-methyl propionate, 2,2-dimethyl-3-hydroxy propionate, ethyl-6-hydroxy hexanoate, t-butyl-2-hydroxy isobutyrate, diethyl-3-hydroxy glutarate, ethyl lactate, isopropyl lactate, butylisobutyl lactate, isobutyl lactate, ethylmandelate, dimethyl ethyl tartrate, ethyl tartrate, dibutyl tartrate, diethyl citrate, triethyl citrate, ethyl 2-hydroxy caproate, or diethyl bis-(hydroxy methyl) malonate; aromatic esters containing at least one hydroxy group such as 2-hydroxy ethyl benzoate, 2-hydroxy ethyl salicylate, methyl 4-(hydroxy methyl) benzoate, methyl 4-hydroxy benzoate, ethyl 3-hydroxy benzoate, 4-methyl salicylate, ethyl salicylate, phenyl salicylate, propyl 4-hydroxy benzoate, phenyl 3-hydroxy naphthenoate, monoethylene glycol monobenzoate, diethylene glycol monobenzoate, triethylene glycol monobenzoate, etc. and; alicyclic esters containing at least one hydroxy group such as hydroxy butyl lactone. In order to obtain the catalyst effectively leading to the production of a UHMWPE having a high bulk density, a narrow particle distribution to obviate too large and small particles, the amount of the ester compound containing at least one hydroxy group should be 0.001~5 mols to a mol of magnesium, preferably 0.01~2 mols.

As for the silicon compound having an alkoxy group, which can be used as another electron donor in the present invention, a compound which is represented by the general formula: $R_nSi(OR')_{4-n}$ (wherein R and R' are hydrocarbons having 1~12 carbons, and "n" is a natural number from 1 to 3) is preferred. In particular, compounds such as dimethyldimethoxysilane, dimethyldiethoxysilane, diphenyldimethoxysilane, methylphenylmethoxysilane, diphenyldiethoxysilane, ethyltrimethoxysilane, vinyltrimethoxysilane, methyltrimethoxysilane, phenyltrimethoxysilane, methyltrimethoxysilane, ethyltriethoxysilane, vinyltriethoxysilane, butyltriethoxysilane, phenyltriethoxysilane, ethyltriisopropoxysilane, vinyltributoxysilane, ethylsilicate, butylsilicate, methyltriaryloxysilane can be used. In order to obtain the catalyst for production of an UHMWPE having a high bulk density and a narrow particle size distribution provided by the present invention, the amount of the abovesaid silicon compound having an alkoxy group should preferably be in the ratio of 0.05~3 mols to a mol of the magnesium, more preferably the ratio 0.1~2 mols. The temperature for the reaction of the liquid magnesium compound solution with an ester compound containing at least one hydroxy group and an alkoxy silicon compound is preferably 0~100° C., or more preferably 10~70° C.

For the catalyst in the present invention, the magnesium compound solution which has been reacted with an ester compound containing at least one hydroxy group and an alkoxy silicon compound is afterwards reacted with a liquid titanium compound represented by the general formula $Ti(OR)_aX_{4-a}$ (wherein R is a hydrocarbon, X is a halogen atom, "a" is a natural number $0 \leq a \leq 4$) and a silicon compound represented by the general formula $R_n SiCl_{4-n}$ (wherein R is a hydrocarbon, "n" is a natural number $0 \leq n \leq 4$), to form a catalyst particles. Of the above general formulae, R represents an alkyl group having the number of 1~10 carbon atoms.

The kind of titanium compounds which satisfy the above general formula $Ti(OR)_aX_{4-a}$ includes, for example, tetrahalogenated titaniums such as $TiCl_4$, $TiBr_4$, and $TiI_4$; trihalogenated alkoxy titaniums such as $Ti(OCH_3)Cl_3$, $Ti(OC_2H_5)Cl_3$, $Ti(OC_2H_5)Br_3$, and $Ti(O(i-C_4H_9)Br_3$; dihalogenated alkoxy titaniums such as $Ti(OCH_3)_2Cl_2$, $Ti(OC_2H_5)_2Cl_2$. $Ti(O(i-C_4H_9))_2Cl_2$, and $Ti(OC_2H_5)_2Br_2$; and tetraalkoxy titaniums such as $Ti(OCH_3)_4$, $Ti(OC_2H_5)_4$, and $Ti(OC_4H_9)_4$. Mixtures of the above titanium compounds can also be used in the present invention. The preferred titanium compounds are halogen-containing compounds, and more preferred one is titanium tetrachloride.

The kind of silicon compounds which satisfy the above general formula $R_nSiCl_{4-n}$, include, for example: tetrachlorosilicon; trichlorosilanes such as methyltrichlorosilane, ethyltrichlorosilane, and phenyltrichlorosilane; dichlorosilanes such as dimethyldichlorosilane, diethyldichlorosilane, diphenyldichlorosilane, and methylphenyldichlorosilane; and a monochlorosilane such as trimethylchlorosilane. The mixtures of these silicon compounds can also be used. The preferred silicon compound is silicon tetrachloride.

In order to obtain the catalyst effectively leading to the production of a UHMWPE with a high bulk density and a narrow particle size distribution, the amount of the mixture of a titanium compound and a silicon compound suitable for the formation of the catalyst particles is preferably 0.1~200 mols to a mol of the magnesium compound, preferably 0.1~100 mols, and more preferably 0.2~80 mols. The ratio of titanium compound to silicon compound in the mixture is preferably 1:0.05~0.95, or more preferably 1:1~0.8.

The shape and size of the solid catalyst component in the present invention may greatly vary depending on the condition of the reaction where the magnesium compound solution reacts with the mixture of titanium and silicon compounds. Therefore, the reaction of the magnesium compound solution with the mixture of titanium and silicon compounds is carried out at a sufficiently low temperature for the formation of solid components. Preferably, the contact reaction is carried out at −70° C.~70° C., and more preferably at −50° C.~50° C. After the contact reaction, the temperature is slowly raised and maintained at 50° C.~150° C. for 30 minutes ~5 hours for sufficient reaction.

The solid catalyst particles obtained by the above-said reaction can be further reacted with a titanium compound. The titanium compound for this purpose is a titanium halide or a halogenated alkoxy titanium having 1~20 carbons of an alkoxy group. In some cases mixtures of these can also be used. Of these, a titanium halide or a halogenated alkoxy titanium having 1~8 carbons of an alkoxy group is preferred, and titanium tetrahalide is still more preferred.

The solid complex titanium catalyst produced by the method provided by the present invention is advantageously used in polymerization and copolymerization of ethylene. In especial, this catalyst is preferably used in polymerization of ethylene and also in copolymerization of ethylene with α-olefins containing three or more carbons such as propylene, 1-butene, 1-pentene, 4-methyl-1-pentene, and 1-hexene.

The polymerization reaction in the presence of the catalyst of the present invention is performed with the use of (i) the solid complex titanium catalyst of the present invention consisting of magnesium, titanium, halogen and an electron donor, and (ii) the organometalic compounds of Groups II and III in the periodic table.

The solid complex titanium catalyst of the present invention can also be pre-polymerized with ethylene or α-olefin, before being used in a polymerization reaction as a component. The pre-polymerization can be performed in the presence of the afore-said catalyst components, an organic aluminum compound such as triethylaluminum, and a hydrocarbon solvent like hexane, under the pressure conditions of ethylene or α-olefin at sufficiently low temperature. Pre-polymerization makes catalyst particles wrapped in polymers to maintain the shape of the catalyst, and thus helps to better the shape of the polymer after the polymerization. The ratio in weight of polymer to catalyst after the pre-polymerization is usually 0.1:1~20:1.

The organometalic compound useful in the present invention can be represented by the general formula $MR_n$, wherein M stands for metals of Groups II or IIIA in the periodic table such as magnesium, calcium, zinc, boron, aluminum or potassium; "R" for alkali groups having 1~20 carbons such as methyl, ethyl, butyl, hexyl, octyl, and decyl; "n" for the atomic valence of metal atom. The example of the more preferred organometalic compounds include trialkylaluminums containing an alkyl group of 1~six carbons such as triethylaluminum and tri-isobutylaluminum and mixtures thereof. In some cases, organic aluminum compounds containing one or more halogen or hydride groups for example ethylaluminum dichloride, diethylaluminum chloride, ethylaluminum sesquichloride, and diisobutylaluminum hydride can be used. Mixtures of these organometalic compounds can also be used.

The polymerization reaction in the present invention is performed in the gas phase or in bulk in the absence of an organic solvent, or carried out in liquid slurry in the presence of an organic solution. These reactions, however, are performed in the absence of oxygen, water, or any compounds that may act as a catalytic poison. In the case of liquid slurry polymerization, the suitable concentration of the solid complex titanium catalyst (i); in the polymerization reaction system, is about 0.001~5 mmols, more preferably about 0.001~0.5 mmols in terms of the titanium atoms of the catalyst to one liter of the solvent. As for the solvent, alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyltoluene, n-propylbenzene, and diethylbenzene; halogenated aromatics such as chlorobenzene, chloronaphthalene, and ortho-dichlorobenzene; and mixtures thereof, can be useful. In the case of gas phase polymerization, the amount of the solid complex titanium catalyst (i) is about 0.001~5 mmols, preferably about 0.001~1.0 mmols, still preferably about 0.01~0.5 mmols in terms of the titanium atoms in the catalyst to a liter of the polymerization reactor volume. The preferable concentration of the organometalic compound (ii) is about 1~2000 mols to a mol of the titanium atoms in the catalyst (i), more preferably about 5~500 mols, calculated by the organometalic atoms. That the concentration and amount of the solid complex catalyst are specified as above is to obtain a polymer having a large bulk density and a narrow particle distribution to admit the least possible amount of too large and small particles.

To secure a high polymerization rate the reaction is performed at a sufficiently high temperature regardless of the polymerization process itself. Generally, approximately 20~200° C. are preferred, and more preferably 20~95° C. The pressure of a monomer during polymerization is adequately the atmospheric ~100, and more preferably 2~50 psi.

Now the present invention is described in further detail below, through the following examples of embodiment and comparative examples. But the present invention is not to be limited to these examples.

EXAMPLE 1

A solid complex titanium catalyst was prepared through the following three steps:

Step (i)
Preparation of Magnesium Solution

Into a 1.0-L reactor equipped with a mechanic stirrer, substituted to nitrogen atmosphere, 9.5 g of $MgCl_2$, 2.46 g of aluminumtributoxide, and 400 ml of decane were placed. After they were stirred at 300 rpm, 80 ml of 2-ethylhexane was added thereto. The temperature was raised to 120° C., then the reaction was allowed to continue for three hours. After the reaction, the obtained homogeneous solution was cooled to room temperature (25° C.).

Step (ii)

Contact-reaction of the Magnesium Solution with Ester Containing Hydroxy and an Alkoxy Silicon Compound To the said magnesium solution cooled to room temperature was added 1.2 ml of 2-hydroxyethylmethacrylate and 10.0 ml of silicontetraethoxide, and the solution was left to react for one hours.

Step (iii)
Treating a Mixture of a Titanium Compound and a Silicon Compound To the above solution cooled to room temperature (25° C.), a mixture of 30 ml of titanium tetrachloride and 30 ml of silicon tetrachloride was added dropwise for one hour. After the dripping, the temperature of the reactor was raised to 80° C., taking one hour, then maintained at the temperature for another hour. After stirring, the supernatent of the solution was separated, and to the remained solid layer 300 ml of decane and 100 ml of titanium tetrachloride were instilled subsequently, the temperature was raised to 100° C. and kept there for two hours. After the reaction, the reactor was cooled to room temperature, and washed with 400 ml of hexane until the un-reacted free titanium tetrachloride was completely removed. The titanium content of the thus prepared solid catalyst was 3.4%.
Polymerization A 2 L high-pressure reactor was dried in an oven and assembled while hot. In order to make the inside of the reactor nitrogen atmosphere, nitrogen and vacuum were alternatively manipulated three times in the reactor. It was then instilled with 1,000 ml of n-hexane, after which 1 mmol of triethylaluminum and 0.01 mmol of the solid catalyst, in terms of titanium atoms. The temperature of the reactor was raised to 70° C. while stirring at 700 rpm. While instilling the ethylene at the pressure of 110 psi, the polymerization was conducted for 1 hour. After the polymerization, the reactor was cooled to room temperature, an excessive amount of ethanol was added to the polymerized matter. The thus prepared polymer was then collected by separation, dried in a vacuum oven at 50° C. for at least six hours, finally to obtain UHMW polyethylene in the form of white powder.

The polymerization activity (polyethylene (kg)/catalyst (g)) was calculated as the weight ratio of the polymers produced (kg) per amount of the catalysts (g) used. The average size of the particles of the polymer was determined by a particle analyzer using laser (Mastersizer X, Malvern), and the particle distribution of the polymer was calculated by (d90-d10)/d50, wherin d10, d50, and d90 respectively means the sizes of the particles by each percentage, 10, 50, and 90, and d50 being defined as the median size. The results of the polymerization are given together with the bulk density (g/ml) and the intrinsic viscosity in Table 1 below.

EXAMPLE 2

The catalyst was produced in the same way as in Example 1, except using 1.62 g of aluminum triethoxide instead of the aluminum tributoxide in Step (i). The titanium content of the thus prepared catalyst was 3.2%. Polymerization was carried out under the same conditions as in Example 1, and the results are shown in Table 1 below.

EXAMPLE 3

The catalyst was produced in the same way as in Example 1, except using 2.30 g of boron tributoxide instead of the aluminum tributoxide in Step (i). The titanium content of thus prepared catalyst was 3.6%. Polymerization was carried out under the same conditions as in Example 1, and the results are shown in Table 1 below.

EXAMPLE 4

The catalyst was produced in the same way as in Example 1, except using 1.46 g of boron triethoxide instead of the aluminum tributoxide in Step (i). The titanium content of the thus prepared catalyst was 3.3%. Polymerization was carried out under the same conditions as in Example 1, and the results are shown in Table 1 below.

EXAMPLE 5

The catalyst was produced in the same way as in Example 1, except using 1.30 g of aluminum trichloride instead of the aluminum tributoxide Step (i). The titanium content of the thus prepared catalyst was 3.3%. Polymerization was carried out under the same conditions as in Example 1, and the results are shown in Table 1 below.

EXAMPLE 6

The catalyst was produced in the same way as in Example 1, except using 4.92 g of aluminum trichloride in Step (i) instead of 2.46 g. The titanium content of the thus prepared catalyst was 3.4%. Polymerization was carried out under the same conditions as in Example 1, and the results are shown in Table 1 below.

EXAMPLE 7

Using 2.4 ml of 2-hydroxy ethylmethacrylate and 10.0 ml of silicon tetraethoxide in Step (ii) of the process for preparing the catalyst in Example 1, the catalyst was prepared as in Example 1. The titanium content of the thus prepared catalyst was 3.8%. Polymerization was carried out under the same conditions as in Example 1, and the results are shown in Table 1 below.

EXAMPLE 8

Using 1.2 ml of 2-hydroxy ethylmethacrylate and 20.0 ml of silicon tetraethoxide in Step (ii) of the process for preparing the catalyst in Example 1, the catalyst was prepared as in Example 1. The titanium content of the thus prepared catalyst was 3.9%. Polymerization was carried out under the same conditions as in Example 1, and the results are shown in Table 1 below.

Comparative Example 1

The catalyst was prepared as in Example 1 above, except using only silicon tetraethoxide, without 2-hydroxy ethylmethacrylate in Step (ii) of the process for preparation of catalyst in Example 1. The titanium content of the thus prepared catalyst was 3.4%. Polymerization was carried out under the same conditions as in Example 1, and the results are shown in Table 1 below.

Comparative Example 2

The catalyst was prepared as in Example 1 above, except using only 2-hydroxy ethylmethacrylate, without silicon tetraethoxide in Step (ii) of the process for preparation of catalyst in Example 1. The titanium content of the thus prepared catalyst was 3.2%. Polymerization was carried out under the same conditions as in Example 1, and the results are shown in Table 1 below.

Comparative Example 3

The catalyst was prepared as in Example 1 above, except using 60 ml of titanium tetrachloride only, without silicon tetrachloride in Step (iii) of the process for preparation of catalyst in Example 1. The titanium content of the thus prepared catalyst was 4.2%. Polymerization was carried out under the same conditions as in Example 1, and the results are shown in Table 1 below.

Comparative Example 4

The catalyst was prepared as in Example 1 above, except using no aluminum tributoxide in Step (i) of the process for preparation of catalyst in Example 1. The titanium content of the thus prepared catalyst was 3.8%. Polymerization was carried out under the same conditions as in Example 1, and the results are shown in Table1 below.

TABLE 1

|  | Activity (P.E.(kg)/ catayst(g)) | Bulk Density (g/ml) | Intrinsic Viscosity (dl/g) | Aver. Particle Size (μm) | Particle Size Distribution (span ratio) |
| --- | --- | --- | --- | --- | --- |
| Example 1 | 28.9 | 0.37 | 22.1 | 168.3 | 0.6 |
| Example 2 | 29.8 | 0.38 | 23.8 | 154.9 | 0.6 |
| Example 3 | 28.7 | 0.37 | 21.9 | 179.1 | 0.7 |
| Example 4 | 27.4 | 0.38 | 19.3 | 152.4 | 0.5 |
| Example 5 | 32.5 | 0.37 | 19.4 | 162.9 | 0.6 |
| Example 6 | 30.6 | 0.36 | 19.6 | 158.4 | 0.6 |
| Example 7 | 27.6 | 0.40 | 22.4 | 156.8 | 0.5 |
| Example 8 | 28.8 | 0.40 | 21.6 | 150.7 | 0.6 |
| Comparative Example 1 | 23.8 | 0.30 | 16.4 | 148.3 | 1.6 |
| Comparative Example 2 | 22.4 | 0.26 | 18.7 | 136.7 | 1.8 |

TABLE 1-continued

|  | Activity (P.E.(kg)/ catayst(g)) | Bulk Density (g/ml) | Intrinsic Viscosity (dl/g) | Aver. Particle Size (μm) | Particle Size Distribution (span ratio) |
| --- | --- | --- | --- | --- | --- |
| Comparative Example 3 | 23.6 | 0.28 | 16.8 | 128.7 | 2.0 |
| Comparative Example 4 | 21.2 | 0.29 | 18.1 | 129.7 | 1.4 |

As shown above, the catalyst prepared by the present invention is excellent in its catalytic activity, and makes possible to obtain an UHMW polyethylene which has high bulk density and such a narrow size distribution without too large and minute particles.

What is claimed is:

1. A method for producing an ultra high molecular weight polyethylene wherein the polymerization is performed by using an organometallic compound And a catalyst prepared by the method comprising:
    (1) producing a magnesium compound solution by contact-reacting a mixture of a halogenated magnesium compound and an aluminum or a boron compound with alcohol;
    (2) reacting the said solution with an ester compound having at least one hydroxy group and a silicon compound having an alkoxy group; and,
    (3) reacting the above with a mixture of a titanium compound and a silicon compound, to obtain a solid titanium catalyst.

2. The method of claim 1, wherein the organometallic compound comprises: a compound represented by the general formula, $MR_n$ (wherein M represents a metal element of Columns 1, 2, 12, or 13 in the periodic table, R represents alkyl group having 1~20 carbons, and "n" means the atomic valences of the metal components); organoaluminum compound having one or more halogen or hydride groups; or mixtures thereof.

3. The method of claim 1, wherein the polymerization comprises: a gas phase polymerization; or liquid slurry polymerization; that in the case of liquid slurry polymerization, the concentration of the catalyst is 0.001~5 mmols in terms of the titanium atoms in the catalyst per a liter of the solvent, and that in the case of gas phase polymerization, the quantity of the catalyst is 0.001~5 mmols in terms of the titanium atoms in the catalyst per a liter of the polymerization reactor volume.

4. The method of claim 1, wherein the catalyst is prepolymerized in the presence of an organoaluminum in a hydrocarbon solvent, under the ethylene or α-olefin pressure condition.

5. A method of forming a catalyst for producing an ultra high molecular weight polyethylene comprising:
    (1) producing a magnesium compound solution by contact-reacting a mixture of a halogenated magnesium compound and an aluminum or a boron compound with alcohol;
    (2) reacting the said solution with an ester compound having at least one hydroxy group and a silicon compound having an alkoxy group; and,
    (3) reacting the above with a mixture of a titanium compound and a silicon compound, to obtain a solid titanium catalyst.

6. A catalyst for producing an ultra high molecular weight polyethylene, prepared by the method comprising:

(1) producing a magnesium compound solution by contact-reacting a mixture of a halogenated magnesium compound and an aluminum or a boron compound with alcohol;

(2) reacting the said solution with an ester compound having at least one hydroxy group and a silicon compound having an alkoxy group; and, (3) reacting the above with a mixture of a titanium compound and a silicon compound represented by the general formula $R_nSiCl_{4-n}$, where R represents a hydrocarbon group and "n" is an integer where $0 \leq n \leq 4$ to obtain a solid titanium catalyst.

7. The catalyst of claim 6, wherein the halogenated magnesium compound comprises: a dihalogenated magnesium; an alkylmagnesium halide; an alkoxymagnesium halide; an aryloxymagnesium halide; or mixtures thereof.

8. The catalyst of claim 6, wherein the aluminum compound comprises: an aluminum halide; a compound represented by the general formula $AlR^1_n(OR^2)_{3-n}$ (wherein $R^1$ stands for hydrocarbon having 1~20 carbons or a halogen atom, $R^2$ for hydrocarbon having 1~20 carbon atoms, and "n" for an integer from 0 to 3); or mixtures thereof.

9. The catalyst of claim 6, wherein the aluminum compound comprises: aluminum triethoxide, aluminum triisopropoxide, aluminum tributoxide, aluminum tri-2-ethylhexanoate, aluminum fluoride, aluminum chloride, aluminum bromide, or aluminum iodide.

10. The catalyst of claim 6, wherein the boron compound comprises: a boron halide; a compound represented by the general formula $BR^1_n(OR^2)_{3-n}$ (wherein $R^1$ stands for hydrocarbon having 1~20 carbons or a halogen atom, $R^2$ for hydrocarbon having 1~20 carbons, and "n" for an integer from 0 to 3); or mixtures thereof.

11. The catalyst of claim 6, wherein the boron compound comprises: boron fluoride, boron chloride, boron bromide trimethylborate, triethylborate, tributylborate, triphenylborate, methylborondiethoxide, ethylborondiethoxide, ethylborondibutoxide, butylborondibutoxide, boron triethoxide, boron tributoxide, phenylborondiphenoxide, diethylboronethoxide, dibutylboronethoxide, diphenylboronphenoxide, diethoxyboronchloride, diethoxyboronbromide, diphenoxyboronchloride, ethoxyborondichloride, ethoxyborondibromide, butoxyborondichloride, phenoxyborondichloride, or ethylethoxyboronchloride.

12. The catalyst of claim 6, wherein the molar ratio of the magnesium compound to the aluminum compound or the boron compound is 1:0.25 or less.

13. The catalyst of claim 6, wherein said ester compound having at least one hydroxy group comprises: an unsaturated fatty acid ester; an aliphatic monoester or polyester; an aromatic ester; or an alicyclic ester.

14. The catalyst of claim 6, wherein said silicon compound having an alkoxy group is a compound represented by the general formula $R_nSi(OR')_{4-n}$ (here R and R' stand for hydrocarbon containing 1~12 carbon atoms, "n" for an integer from 1~3).

15. The catalyst of claim 6, wherein the silicon compound having an alkoxy group comprises: dimethyldimethoxysilane, dimethyldiethoxysilane, diphenyldimethoxysilane, methylphenylmethoxysilane, diphenyldiethoxysilane, ethyltrimethoxysilane, vinyltrimethoxysilane, methyltrimethoxysilane, phenyltrimethoxysilane, methyltriethoxysilane, ethyltriethoxysilane, vinyltriethoxysilane, butyltriethoxysilane, phenyltriethoxysilane, ethyltriisopropoxysilane, vinyltributoxysilane, ethylsilicate, butylsilicate, or methyltriaryloxysilane.

16. The catalyst of claim 6, wherein the amount of said ester compound having at least one hydroxy group is 0.001~5 mols per 1 mol of the magnesium, and the amount of said silicon compound having an alkoxy group is 0.05~3 mols per 1 mol of the magnesium.

17. The catalyst of claim 6, wherein the titanium compound is a compound represented by the general formula: $Ti(OR)_aX_{4-a}$ (R stands for a hydrocarbon group, X for halogen atom, and "a" for natural number $0 \leq a \leq 4$).

18. The catalyst of claim 6, wherein the titanium compound comprises: a tetrahalogenated titanium; a trihalogenated alkoxy titanium; a dihalogenated alkoxy titanium; a tetraalkoxy titanium; or mixtures thereof.

19. The catalyst of claim 6, wherein the titanium compound is titanium tetrachloride, and the silicon compound is silicon tetrachloride.

20. The catalyst of claim 6, wherein the amount of the mixture of the titanium compound and the silicon compound is 0.1~200 mols per 1 mol of the magnesium compound, and the molar ratio of the titanium compound to the silicon compound in the mixture is 1:0.05~0.95.

21. The catalyst of claim 6, wherein the method further comprises reacting the solid titanium catalyst obtained from the Step (3) with a titanium compound.

22. The catalyst of claim 6, wherein the halogenated magnesium compound comprises: magnesium chloride, magnesium iodide, magnesium fluoride, magnesium bromide, methylmagnesium halide, ethylmagnesium halide, propylmagnesium halide, butylmagnesium halide, isobutylmagnesium halide, hexylmagnesium halide, amylmagnesium halide, methoxymagnesium halide, ethoxymagnesium halide, isopropoxymagnesium halide, butoxymagnesium halide, octoxymagnesium halide, phenoxymagnesium halide, or methylphenoxymagnesium halide.

23. The catalyst of claim 6, wherein the ester compound having at least one hydroxy group comprises: 2-hydroxy ethylacrylate; 2-hydroxy ethylmethacrylate; 2-hyrdoxy propylacrylate; 2-hydroxy propylmethacrylate; 4-hydroxy butylacrylate; pentaerythritol triacrylate; 2-hydroxy ethylacetate; methyl 3-hydroxy butyrate; ethyl 3-hydroxy butyrate; methyl 2-hydroxy isobutyrate; ethyl 2-hydroxy isobutyrate; methyl 3-hydroxy-2-methylpropionate; 2,2-dimethyl-3-hydroxy propionate; ethyl-6-hydroxy hexanoate; t-butyl-2-hydroxy isobutyrate; diethyl-3-hydroxy glutarate; ethyl lactate; isopropyl lactate; butyl isobutyl lactate; isobutyl lactate; ethyl mandelate; dimethyl ethyl tartrate; ethyl tartrate; dibutyl tartrate; diethyl citrate; triethyl citrate; ethyl 2-hydroxy caproate; diethyl bis-(hydroxy methyl) malonate; 2-hydroxy ethyl benzoate; 2-hydroxy ethyl salicylate; methyl 4-(hydroxy methyl)benzoate; methyl 4-hydroxy benzoate; ethyl 3-hydroxy benzoate; 4-methyl salicylate; ethyl salicylate; phenyl salicylate; propyl 4-hydroxy benzoate; phenyl 3-hydroxy naphthanoate; monoethylene glycol monobenzoate; diethylene glycol monobenzoate; triethylene glycol monobenzoate; or hydroxy butyllactone.

24. The catalyst of claim 6, wherein the titanium compound comprises: $TiCl_4$, $TiBr_4$, $TiI_4$, $Ti(OCH_3)Cl_3$, $Ti(OC_2H_5)Cl_3$, $Ti(OC_2H_5)Br_3$, $Ti(O(i-C_4H_5)Br_3)$, $Ti(OCH_3)_2Cl_2$, $Ti(OC_2H_5)_2Cl_2$, $Ti(O(i-C_4H_9))_2Cl_2$, $Ti(OC_2H_5)_2Br_3$, $Ti(OCH_3)_4$, $Ti(OC_2H_5)_4$, $Ti(OC_4H_9)_4$; or mixtures thereof.

25. The catalyst of claim 6, wherein the silicon compound comprises: silicon tetrachloride; a trichlorosilane; a dichlorosilane; a monochlorosilane; or mixtures thereof.

26. The catalyst of claim 6, wherein the silicon compound comprises: silicon tetrachloride, methyltrichlorosilane, ethyltrichlorosilane, phenyltrichlorosilane, dimethyldichlorosilane, diethyldichlorosilane, diphenyldichlorosilane, methylphenyldichlorosilane, trimethylchlorosilane, or mixtures thereof.

* * * * *

UNITED STATES PATENT AND TRADEMARK OFFICE
CERTIFICATE OF CORRECTION

PATENT NO.    : 6,559,249 B2
DATED         : May 6, 2003
INVENTOR(S)   : Yang et al.

It is certified that error appears in the above-identified patent and that said Letters Patent is hereby corrected as shown below:

Column 12,
Line 55, please delete "Ti(O(i—$C_4H_5$)$Br_3$)," and substitute therefor
-- "Ti(O(i—$C_4H_9$)$Br_3$)," --.

Signed and Sealed this

Sixteenth Day of September, 2003

JAMES E. ROGAN
*Director of the United States Patent and Trademark Office*